(12) United States Patent
Mobasher et al.

(10) Patent No.: US 9,780,843 B2
(45) Date of Patent: Oct. 3, 2017

(54) INTERFERENCE SUPPRESSION AND ALIGNMENT FOR CELLULAR NETWORKS

(71) Applicant: Avago Technologies General IP (Singapore) Pte. Ltd.

(72) Inventors: Amin Mobasher, Sunnyvale, CA (US); Louay Jalloul, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 642 days.

(21) Appl. No.: 13/838,317

(22) Filed: Mar. 15, 2013

(65) Prior Publication Data

US 2014/0140317 A1    May 22, 2014

Related U.S. Application Data

(60) Provisional application No. 61/796,635, filed on Nov. 16, 2012, provisional application No. 61/796,636, filed on Nov. 16, 2012.

(51) Int. Cl.

| | |
|---|---|
| *H04W 4/00* | (2009.01) |
| *H04L 27/28* | (2006.01) |
| *H04B 15/00* | (2006.01) |
| *H04L 1/02* | (2006.01) |
| *H04B 7/024* | (2017.01) |

(Continued)

(52) U.S. Cl.
CPC .......... *H04B 7/024* (2013.01); *H04J 11/0033* (2013.01); *H04B 7/0639* (2013.01)

(58) Field of Classification Search
CPC ...... H04B 7/024; H04B 7/0639; H04B 15/00; H04J 11/0033; H04W 72/08; H04W 72/082; H04W 4/00; H04L 5/0035

USPC ........................................................ 370/330
See application file for complete search history.

(56) References Cited

U.S. PATENT DOCUMENTS

| | | | |
|---|---|---|---|
| 9,148,818 B2* | 9/2015 | Yue ........................ | H04L 5/001 |
| 2006/0153283 A1* | 7/2006 | Scharf .................. | H04B 1/7107 |
| | | | 375/148 |

(Continued)

OTHER PUBLICATIONS

First Chinese Office Action (with English translation) directed to related Chinese Patent Application No. CN103825674 (A), mailed Sep. 28, 2016; 15 pages.

*Primary Examiner* — Edan Orgad
*Assistant Examiner* — Vanneilian Lalchinthang
(74) *Attorney, Agent, or Firm* — Sterne, Kessler, Goldstein & Fox P.L.L.C.

(57) ABSTRACT

An interference suppression (IS) time/frequency zone for improved interference suppression at the user equipment (UE) is provided. The IS time/frequency zone can be scheduled and set up using existing signaling of the Almost Blank Subframe (ABS) framework. This includes using the existing signaling of the ABS framework to schedule the IS time/frequency zone, coordinate transmission parameters among base stations for the IS time/frequency zone, and signal the IS time/frequency zone to the UE. In another aspect, interfering base stations align respective reference signals during the IS time/frequency zone, which allows the UE to measure the channels from its serving base station and/or the interfering base stations(s). With channel state information knowledge at the UE, interference alignment can be achieved at the UE during the IS time/frequency zone.

20 Claims, 12 Drawing Sheets

(51) Int. Cl.
*H04J 11/00* (2006.01)
*H04B 7/06* (2006.01)

(56) References Cited

U.S. PATENT DOCUMENTS

| | | | | |
|---|---|---|---|---|
| 2006/0280142 | A1* | 12/2006 | Damnjanovic | H04B 7/2615 370/329 |
| 2009/0325590 | A1* | 12/2009 | Liu | H04W 72/082 455/452.2 |
| 2010/0009634 | A1* | 1/2010 | Budianu | H04W 52/244 455/63.1 |
| 2010/0080323 | A1* | 4/2010 | Mueck | H04J 11/0033 375/296 |
| 2010/0238821 | A1 | 9/2010 | Liu et al. | |
| 2011/0206154 | A1* | 8/2011 | Ding | H04B 7/024 375/267 |
| 2012/0113843 | A1* | 5/2012 | Watfa | H04W 72/1289 370/252 |
| 2012/0213261 | A1* | 8/2012 | Sayana | H04L 5/0094 375/224 |
| 2012/0281780 | A1* | 11/2012 | Huang | H04B 7/0452 375/267 |
| 2012/0289267 | A1* | 11/2012 | Seo | H04B 7/0417 455/501 |
| 2013/0229992 | A1* | 9/2013 | Yue | H04L 5/001 370/329 |
| 2014/0112410 | A1* | 4/2014 | Yokoyama | H04J 11/0023 375/285 |

\* cited by examiner

INTERFERENCE SUPPRESSION AND ALIGNMENT FOR CELLULAR NETWORKS

CROSS-REFERENCE TO RELATED APPLICATIONS

The present application claims the benefit of U.S. Provisional Application No. 61/796,635, filed Nov. 16, 2012, and U.S. Provisional Application No. 61/796,636, filed Nov. 16, 2012, both of which are incorporated herein by, reference in their entireties.

The present application is related to U.S. application Ser. No. 13/838,387, filed Mar. 15, 2013, titled "Interference Suppression for Cellular Networks", which is incorporated herein by reference in its entirety.

BACKGROUND

Field of Invention

The present disclosure relates generally to interference suppression in cellular networks.

Background Art

Wireless networks, such as cellular networks for example, are experiencing a significant increase in traffic demand. This makes interference management significantly important for adequate user experience.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, or devices, or any combination thereof), and any combination thereof addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by the Long-Term Evolution (LTE) standard are sometimes used. For example, the term "eNodeB" is used to refer to what is commonly described as a base station (BS) or base transceiver station (BTS) in other standards. The term is also used to refer to what is known as a relay or small cell transmitter in LTE standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other wireless communication standards.

Figure 1:
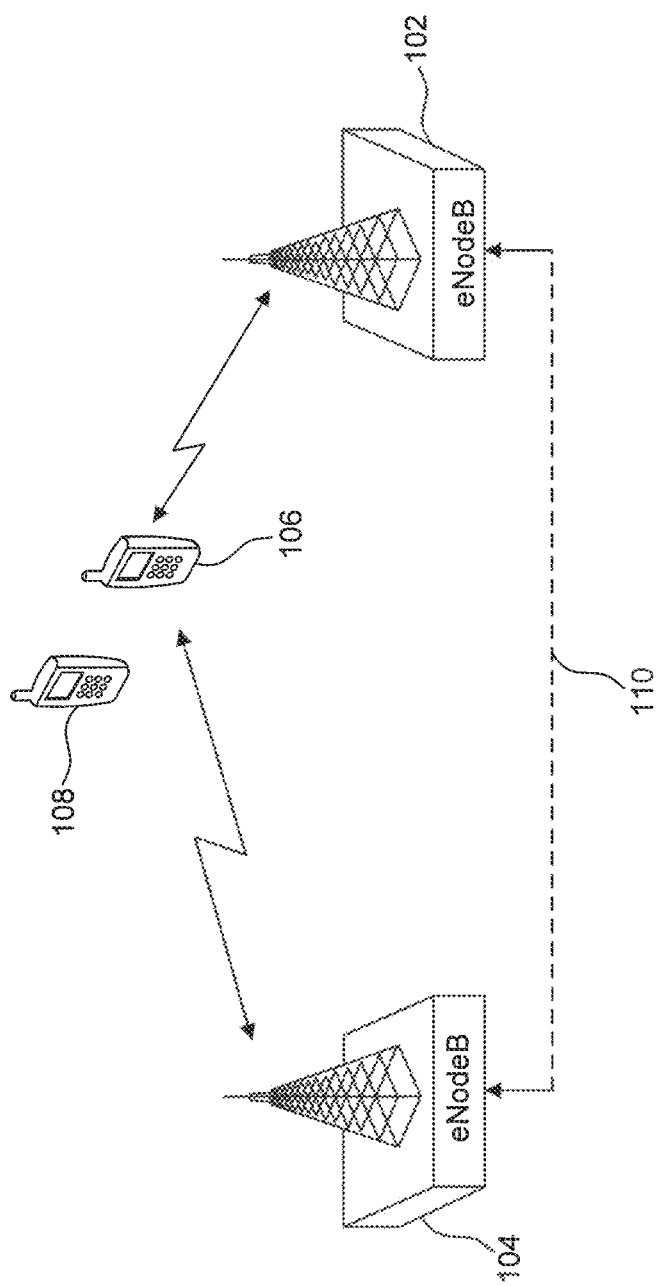
FIG. 1 illustrates an example cellular network environment in which embodiments can be used or implemented.

FIG. 1 illustrates an example cellular network environment 100 in which embodiments can be used or implemented. Example cellular network environment 100 is provided for the purpose of illustration only and is not limiting of embodiments. As will be apparent to a person of skill in the art, embodiments are not limited to cellular networks and may be applied to other types of wireless communication networks. As such, in the following, where an embodiment is described with reference to a base station, in other embodiments the base station can be replace with any kind of transmitter.

As shown in FIG. 1, example network environment 100 includes an Evolved Node B (eNodeB) 102, an eNodeB 104, a User Equipment (UE) 106, and a UE 108. eNodeB 102 and eNodeB 104 may communicate via a backhaul network (e.g., X2 interface) link 110. UEs 106 and 108 can be any wireless device capable of cellular-based communication, including a cellular phone, tablet, laptop, etc. eNodeBs 102 and 104 may each support a plurality of serving cells (each serving cell is the equivalent of a base station and has a unique cell ID that identifies it to UEs). Depending on its receiver capabilities, UE 106 or UE 108 may communicate with one or more serving cells of eNodeB 102 and/or eNodeB 104.

For the purpose of illustration of embodiments, it is assumed that UE 106 is served by a first cell (base station) located at eNodeB 102, and that a second cell (base station) located at eNodeB 104 serves UE 108. It is further assumed that eNodeB 102 and eNodeB 104 are within the same geographical area such that signals transmitted from the second cell at eNodeB 104, for example to UE 108, may interfere with signals transmitted from the first cell at eNodeB 102 to UE 106, and/or vice versa. For example, eNodeB 102 and eNodeB 104 can be in nearby cells of a cellular network, within the same cell of the cellular network, or in nearby sectors of the same cell of the cellular network. Further, eNodeB 102 and eNodeB 104 can be part of a microcell, picocell, femtocell, or small cell network, located outdoor and/or indoor.

As would be understood by a person of skill in the art based on the teachings herein, embodiments are not limited by the above example scenario. In other embodiments, the interfering base station can be located at the same eNodeB (eNodeB 102) as the serving base station of UE 106. Also, in another embodiment, different remote radio heads belonging to one or more eNodeBs can be considered as the base stations 102 and 104. Further, embodiments can be extended to environments that include a plurality of interfering base stations (located at same or different eNodeBs) that interfere with the serving base station at UE 106.

Figure 2:
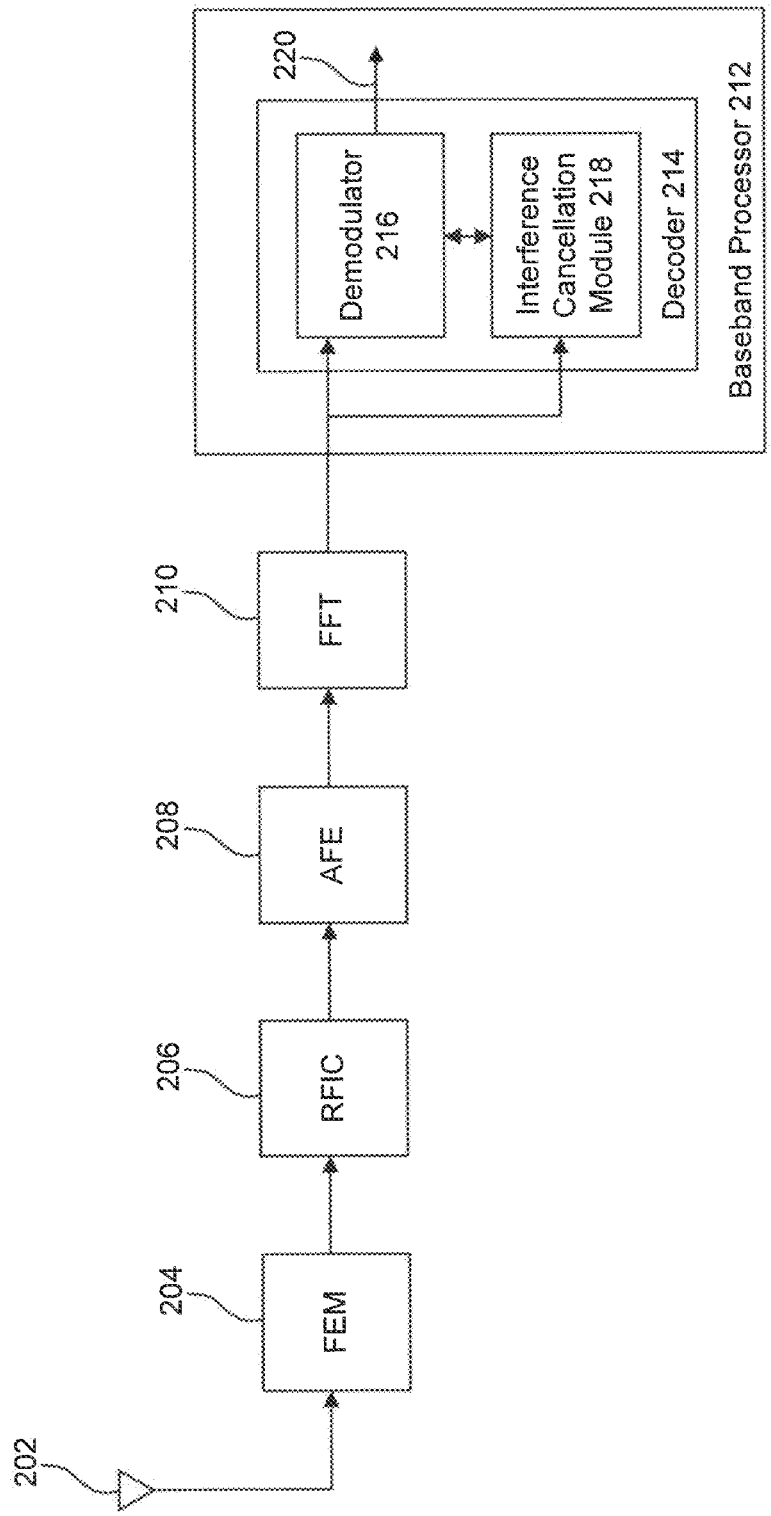
FIG. 2 illustrates an example receiver according to an embodiment.

FIG. 2 illustrates an example receiver 200 according to an embodiment. Example receiver 200 is provided for the purpose of illustration only and is not limiting of embodiments. Example receiver 200 can be implemented in a UE, such as UE 106, for example, and can be used to receive Orthogonal Frequency Division Multiplexing (OFDM)-based signals.

As shown in FIG. 2, example receiver 200 includes a receive antenna 202, a front-end module (FEM) 204 (e.g., may include discrete components such as duplexes, switches, and filters), a radio frequency integrated circuit (RFIC) 206 (e.g., may include analog components such as mixers, low-pass filters, etc.), an analog front-end (AFE) 208 (e.g., may include mixed signal components such as digital-to-analog converters), a Fast Fourier Transform (FFT) module 210, and a baseband processor 212. Operation of FEM 204, RFIC 206, APE 208, and FFT module 210 are well known in the art and are not described herein.

Baseband processor 212 includes, among other components, a decoder 214, which includes a demodulator 216 and an interference cancellation module 218. In another embodiment (not shown in FIG. 2), demodulator 216 and interference cancellation module 218 are combined in a single module, which performs the functions of both demodulator 216 and module 218. Demodulator 216 is configured to generate a data bit stream 220 based on the output of FFT module 210. Typically, the output of FFT module 210 includes a composite signal of a desired information signal and interference. Data bit stream 220 is representative of an estimate of the desired information signal. Demodulator 216 can be aided by interference cancellation module 218 to enhance data bit stream 220 by reducing or eliminating the interference in the composite signal used by demodulator 216 to generate data bit stream 220.

Interference cancellation module 218 may implement an interference cancellation technique, such as interference rejection combining (IRC), successive interference cancellation (SIC), and maximum likelihood (ML) interference cancellation, to name a few examples. In an embodiment, interference cancellation module 218 is configured to estimate the interference in the output of FFT module 210 and to provide the estimated interference to demodulator 216. Demodulator 216 uses the estimated interference from module 218 to enhance the decoding performance of data bit stream 220. In an embodiment, interference cancellation module 218 is configured to decode the interference (e.g., generate a symbol stream representative of the interference) and to provide the decoded interference to demodulator 216. Demodulator 216 subtracts the decoded interference from the composite signal to generate data bit stream 220.

To mitigate interference at the UE in scenarios such as the one described above in FIG. 1, the LTE standard (up to Release-11) defines an Almost Blank Subframe (ABS) that can be scheduled by a serving base station in coordination with the interfering base station(s). During the ABS, the interfering base station(s) transmits pilot and control information only (data tones are left blank, hence the naming of Almost Blank Subframe). The serving base station signals to the UE the position of the ABS and the cell ID(s) of the interfering base station(s). This allows the UE, when equipped with an interference cancellation receiver (e.g., receiver 200), to decode the pilot/control information transmitted by the interfering base station(s), and then remove the decoded pilot/control information from the received signal.

Thus, the ABS framework enables the serving base station to provide the UE with periods of reduced interference and higher signal-to-interference ratio (SIR). However, the ABS framework comes at the expense of the interfering base station(s) having to halt data transmission during the ABS. This reduces the downlink throughput provided to UEs served by the interfering base station(s).

Another ABS mode, known as Reduced Power ABS, allows the interfering base station(s) to transmit data as well as pilot and control information during the ABS, but at a reduced power so that the UE can treat transmissions from the interfering base station(s) as noise. Reduced power transmission by the interfering base station(s) also comes at the expense of the downlink throughput of UEs served by the interfering base station(s) because the interfering base station(s) typically need to transmit at a lower modulation rate to support the reduced power transmission.

In commonly owned U.S. application Ser. No. 13/838,387, filed Mar. 15, 2013, titled "Interference Suppression for Cellular Networks", which is incorporated herein by reference, a framework for assisting UEs reduce interference from interfering base station(s), without degrading the downlink throughput of the interfering base station(s) is provided. Specifically, the framework enables an interference suppression (IS) time and frequency (time/frequency) zone, which can be scheduled by a serving base station (with or without coordination with the interfering base station(s)) and signaled to the UE. In one embodiment, the IS time/frequency zone can be scheduled to coincide with a network condition favorable to interference suppression at the UE, and thus can be used by the UE to apply interference suppression with positive effect. The network condition favorable to interference suppression at the UE can be created by the serving base station in coordination with the interfering base station(s), by setting (and/or fixing) their respective transmission parameters during the IS time/frequency zone. In another embodiment, the serving base station opportunistically schedules the IS time/frequency zone for the UE whenever the base station or the UE determines favorable transmission parameters being used or scheduled for use by the interfering base station(s). In an embodiment, the transmission parameters of the serving and/or interfering base station(s) that may be set include one or more of transmission mode (TM), transmission power level, modulation scheme, coding scheme, pilot timing and/or structure, frame structure, resource allocation mode, and any other parameter which setting can facilitate interference suppression at the assisted UE.

The UE applies interference suppression processing within the IS time/frequency zone, thereby improving receiver performance. Outside the time/frequency zone, the UE may disable interference suppression processing so as not to degrade receiver performance. During the IS time/ frequency zone, the interfering base station(s) transmit but may coordinate with the serving base station certain transmission parameters.

In the present disclosure, further embodiments for using the IS time/frequency zone for improved interference suppression at the UE are provided. Specifically, in an embodiment, the IS time/frequency zone can be scheduled and set up using existing signaling of the ABS framework (described in LTE Release-10 and LTE Release-11, which are incorporated herein by reference in their entireties). This includes using the existing signaling of the ABS framework to enable, disable, and schedule the IS time/frequency zone, coordinate transmission parameters for the IS time/frequency zone, and signal the IS time/frequency zone to the UE. This makes the IS time/frequency zone framework a logical extension of ABS for future LTE standards.

In another aspect, reference signals of the serving base station and the interfering base station(s) can be aligned during the IS time/frequency zone to allow the UE to measure the channels from the serving base station and/or the interfering base stations(s). Enhanced interference suppression at the UE can be achieved as a result of estimating the channels from the serving base station and/or the interfering base station(s) as further described below.

Figure 3:
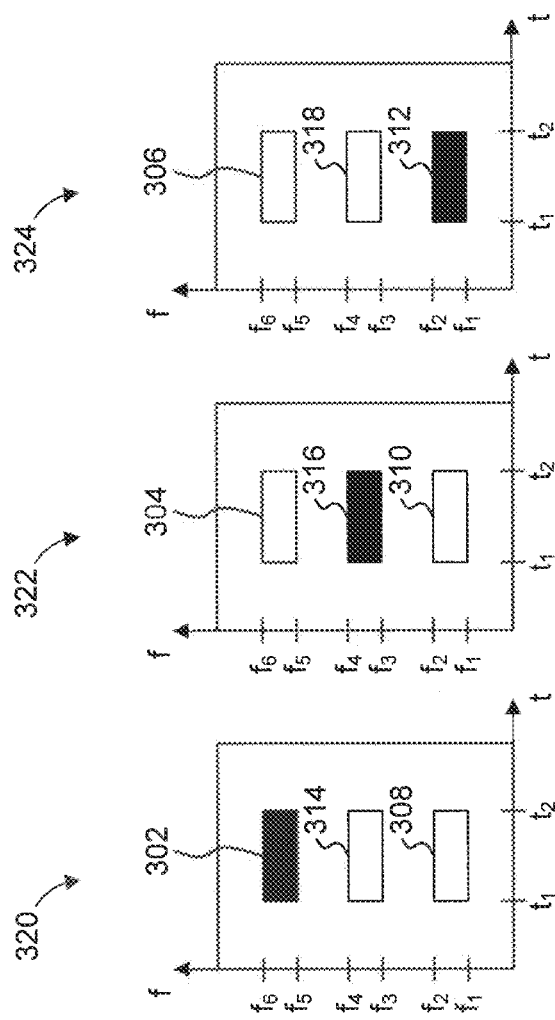
FIG. 3 is an example that illustrates the alignment of serving and interfering reference signals according to an embodiment.

FIG. 3 is an example 300 that illustrates the alignment of serving and interfering reference signals during an IS time/frequency zone according to an embodiment. Example 300 is provided for the purpose of illustration and is not limiting of embodiments. Specifically, example 300 illustrates example transmission schedules 320, 322, and 324 of a serving base station and two interfering base stations to their associated UEs, respectively, according to an embodiment. In an embodiment, the two interfering base stations represent the two main interferers to the UE served by the serving base station, and the interference from other interfering base stations to this UE is sufficiently low that it can be treated as noise. As would be understood by a person of skill in the art based on the teachings herein, embodiments are not limited to example 300, and more specifically are not limited to only three base stations.

Transmission schedule 320 (resource grid as termed in LTE) of the serving base station includes a few resource elements (RE) 302 designated for transmitting a first reference signal and REs 308 and 314 designated for transmitting a second and third reference signals (the second and third reference signals are herein referred to collectively as secondary reference signals, which can include zero power reference signals as further described bellow). Transmission schedule 322 of a first one of the two interfering base stations includes REs 316 designated for transmitting the first reference signal to a UE served by the first interference base station and REs 304 and 310 designated for transmitting the second and third reference signals (including zero power reference signals). Transmission schedule 324 of a second one of the two interfering base stations includes REs 312 designated for transmitting the first reference signal to a UE served by the first interference base station and REs 306 and 318 designated for transmitting the second and third reference signals (including zero power reference signals).

In another embodiment, the REs 302 can correspond to all the REs that the serving base station allocates to multiple UEs for one port of the serving base station. As would be understood by a person of skill in the art based on the teachings herein, REs 302 are not limited to be allocated continuously in time or frequency, even though they are depicted as contiguous in FIG. 3. The same applies to all REs allocated for other reference signals for serving and interfering base stations.

As would be understood by a person of skill in the art based on the teachings herein, FIG. 3 represents the resource grid for one port of the serving base station and the interfering base stations. If the base stations have multiple ports (multiple antennas), there would be a resource grid per antenna tort, and per resource grid there would be REs allocated for reference signals.

As shown in FIG. 3, the RE designated for transmitting the first reference signal, for each of the serving base station and the two interfering base stations, is aligned in time and frequency with REs designated for transmitting the secondary reference signals (second and third reference signals) at the other two base stations. For example, REs 302 of the serving base station is aligned in time and frequency with REs 304 and REs 306 of the two interfering base stations. REs 316 of the first one of the two interfering base stations is aligned in time and frequency with REs 314 of the serving base station and REs 318 of the second one of the two interfering base stations.

In an embodiment, the first reference signal corresponds to the non-zero power (NZP) channel state information (CSI) reference signal (RS) (NZP-CSI-RS) and the second and third reference signals (secondary reference signals) correspond to the zero power (ZP) CSI RS (ZP-CSI-RS), which are defined by the LTE standard. In another embodiment the reference signals can be zero-power and non-zero power DeModulating Reference Signals (DMRS) (e.g., first reference is non-zero power DMRS and second and third reference signals are zero power DMRS). Accordingly, the UE can measure the downlink channel from the serving base station over the time and frequency REs 302 because REs 302 carries non-zero power reference signal and REs 304 and 306 carry zero power reference signal from the serving base station. The UE can also measure the downlink channel from the first one of the two interfering base stations over the time and frequency REs 314 because RE 316 carries non-zero power signaling and REs 314 and 318 carry zero power signaling, and can measure the downlink channel from the second of the two interfering base stations over the time and frequency REs 308 because REs 312 carries non-zero power signaling and REs 308 and 310 carry zero power signaling. As would be understood by a person of skin in the art, any other UE served by the serving base station or by one of the two interfering base stations can also rely on the alignment of the first and secondary reference signals as described above to measure the downlink channels from its serving base stations and interfering base stations.

In an embodiment, the alignment of the first and second reference signals as described above is coordinated among the base stations ahead of the scheduling of an IS time/frequency zone and signaled by each base station to its served UEs. In an embodiment, the alignment is signaled to the UEs along with the signaling of the scheduling of the IS time/frequency zone and any set transmission parameters during the IS time/frequency zone. As would be understood by a person of skill in the art based on the teachings herein, the alignment of the reference signals could be independent of the scheduling of the IS time/frequency zone.

Figure 4:
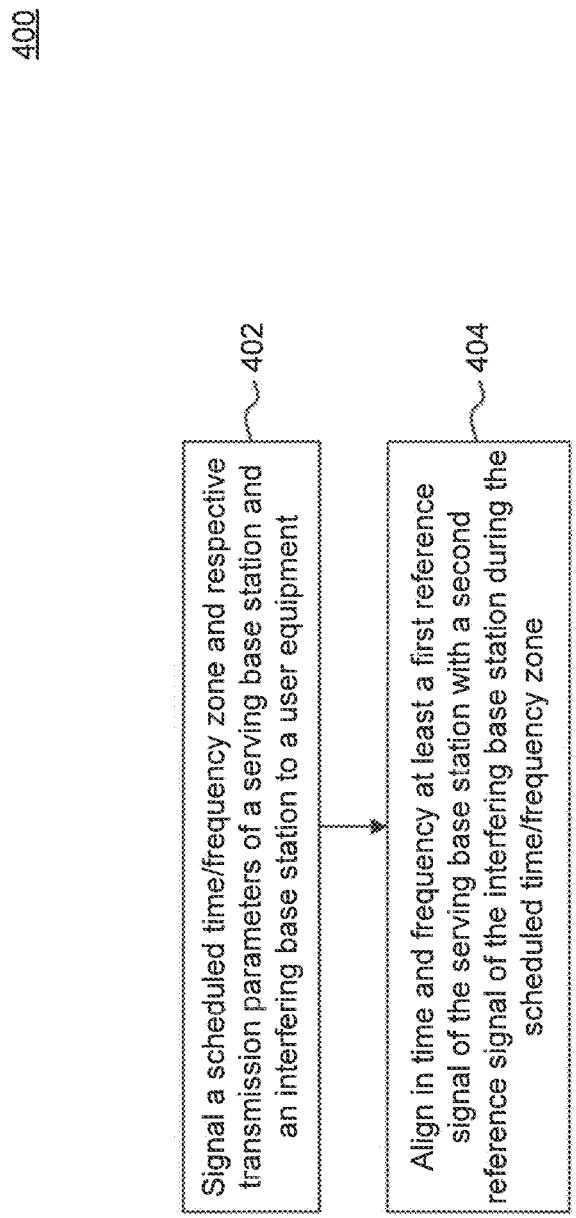
FIG. 4 is an example process for facilitating interference suppression at a user equipment (UE) according to an embodiment.

FIG. 4 is an example process 400 for facilitating interference suppression at a user equipment (UE) according to an embodiment. Example process 400 is provided for the purpose of illustration only and is not limiting. Example process 400 can be performed by a base station or a higher level controller in a cellular network, for example.

As shown in FIG. 4, example process 400 begins in step 402, which includes signaling a scheduled time/frequency zone and respective transmissions parameters of a serving base station and interfering base stations during the scheduled time/frequency zone to the UE. In an embodiment, step 402 includes using existing signaling of the ABS framework to signal the scheduled time/frequency zone and any transmission parameters to the UE. In another embodiment, step 402 includes, alternatively or additionally, using a signaling scheme as described in commonly owned U.S. application Ser. No. 13/838,387, filed Mar. 15, 2013, titled "Interference Suppression for Cellular Networks", which is incorporated herein by reference. In an embodiment, the respective transmission parameters of the serving base station and the interfering base station during the scheduled time/frequency zone are coordinated between the serving base station and the interfering, base station using existing signaling of the ABS framework.

Subsequently, process 400 proceeds to step 404, which includes aligning in time and frequency at least a first reference signal of the serving base station with a second reference signal of the interfering base station during the scheduled time/frequency zone. In an embodiment, step 404 further includes aligning in time and frequency a non-zero power reference signal of the serving base station with a zero power reference signal of the interfering base station during the scheduled time/frequency zone. In another embodiment, step 404 further includes aligning in time and frequency a zero power reference signal of the serving base station with a non-zero power reference signal of the interfering base station during the scheduled time/frequency zone. In an embodiment, the non-zero power reference signal corresponds to the NZP-CSI-RS and the zero power reference signal corresponds to the ZP-CSI-RS, defined in the LTE standard.

In an embodiment, the respective transmission parameters of the interfering base station include a cell identifier (ID) of the interfering base station. This allows the UE to identify the pilot information transmitted by the interfering base station in the non-zero power reference signal, and therefore use the non-zero power reference signal of the interfering base station to estimate the downlink channel from the interfering base station to the UE. Further, with side information regarding the modulation scheme used by the interfering base station during the scheduled time/frequency zone (can be signaled to the UE as part of the transmission parameters of the interfering base station), the UE can decode the interference from the interfering base station and then remove it from the signal received at the UE.

Figure 5:
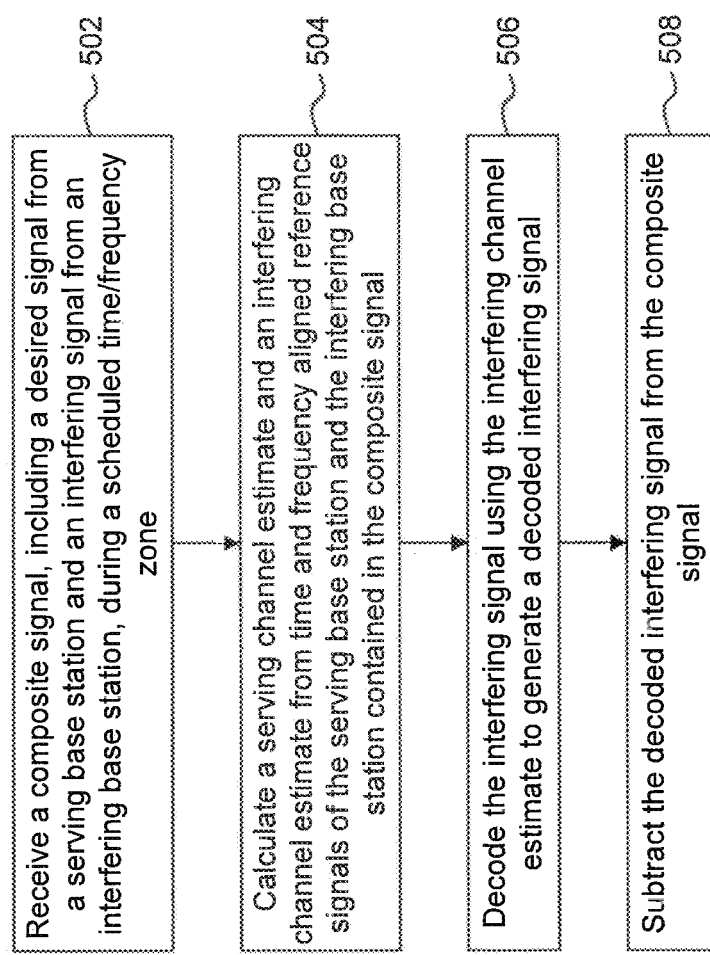
FIG. 5 is an example process for interference suppression according to an embodiment.

FIG. 5 is an example process 500 for interference suppression according to an embodiment. Example process 500 is provided for the purpose of illustration only and is not limiting of embodiments. Example process 500 can be performed by a UE, such as example UE 200 described with reference to FIG. 2 above.

As shown in FIG. 5, example process 500 begins in step 502, which includes receiving a composite signal, including a desired signal from a serving base station and an interfering signal from an interfering base station, during a scheduled time/frequency zone. In an embodiment, each of the desired signal and the interfering signal includes data and reference signals.

Subsequently, in step 504, process 500 includes calculating a serving channel estimate and an interfering channel estimate from time and frequency aligned reference signals of the serving base station and the interfering base station contained in the composite signal. In an embodiment, the desired signal and the interfering signal include time and frequency aligned reference signals as described above, including a non-zero power reference signal of the serving base station that is time and frequency aligned with a zero power reference signal of the interfering base station and a zero power reference signal of the serving base station that is time and frequency aligned with a non-zero power reference signal of the interfering base station. Accordingly, step 504 includes calculating the serving channel estimate (downlink channel from the serving base station to the UE) using the non-zero power reference signal of the serving base station, and the interfering channel estimate (downlink channel from the interfering base station to the UE) using the non-zero power reference signal of the interfering base station. In an embodiment, the UE has knowledge of the pilot information contained in each of the non-zero power reference signals.

Then, process 500 proceeds to step 506, which includes decoding the interfering signal using the interfering channel estimate to generate a decoded interfering signal. In an embodiment, by determining the interfering channel estimate, the UE can accurately symbol de-map the interfering signal by knowledge of the modulation scheme used by the interfering base station. In an embodiment, the modulation scheme of the interfering base station is signaled to the UE ahead of the scheduled time/frequency zone. It is noted that the UE is able to perform step 506 because the interfering base transmits at normal power during the scheduled time/frequency zone such that the UE can treat the interfering base station as an interferer (not as noise). Finally, process 500 terminates in step 508, which includes subtracting the decoded interfering signal from the composite signal. The remaining signal can then be decoded to retrieve the desired signal.

Accordingly, improved performance interference suppression can be achieved at the UE according to embodiments. Furthermore, by virtue of this improved interference suppression at the UE, interfering base stations can use higher power and/or higher modulation orders to transmit to their served UEs, resulting in higher overall data throughput in the network.

In a further aspect, embodiments provide schemes for interference alignment which can be used to reduce interference at the UE and to further increase data throughput in the network by freeing up parts of the signaling space typically occupied by interference to be used for receiving desired signals at the UE. As further described below, the provided interference alignment schemes can benefit from the above described embodiments to result in improved interference alignment.

Figure 6:
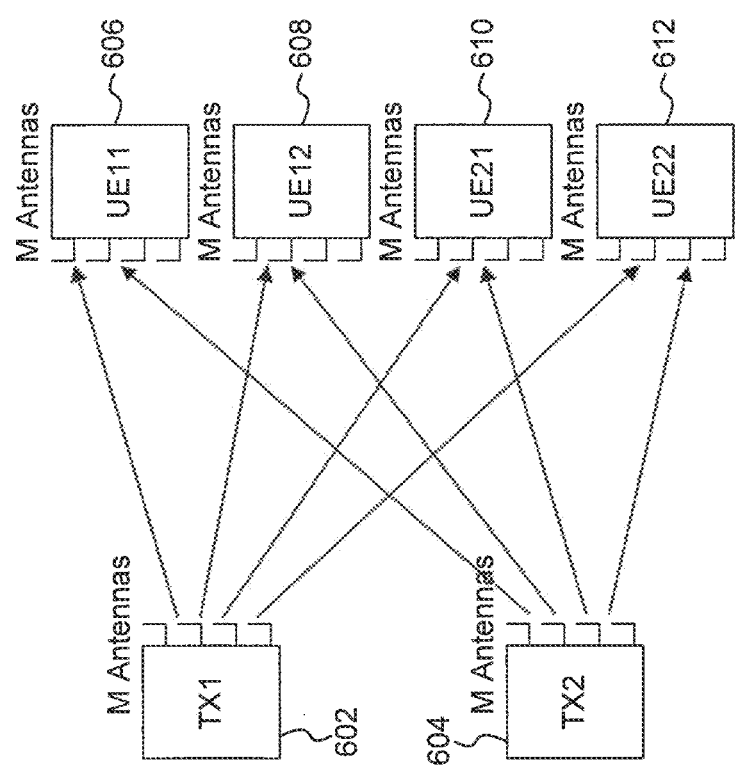
FIG. 6 is an example that illustrates glee effects of interference on data throughput in a network.

FIG. 6 is an example 600 that illustrates the effects of interference on data throughput in a cellular network. Example 600 is provided for the purpose of illustration only and is not limiting of embodiments. As shown in FIG. 6, example 600 includes a first base station 602, a second base station 604, and UEs 606, 608, 610, and 612. For the purpose of illustration only, it is assumed that first base station 602 serves UEs 606 and 608, and that second base station 604 serves UE 610 and 612. It is further assumed that each of first base station 602 and second base station 604 includes M transmit antennas, and that each of UEs 606, 608, 610, and 612 includes M receive antennas, where M is an integer (e.g., 4).

Due to their proximity to each other, first base station 602 interferes at UEs 610 and 612 served by second base station 604, and second base station 604 interferes with UEs 606 and 608 served by first base station 602, which limits the overall data throughput of the cellular network. For example, assuming M=4 antennas for all the base stations and UEs in FIG. 6, if first base station 602 serves each of UEs 606 and 608 with a single data stream, the interference due to first base station 602 occupies two dimensions of the four dimensional space of the receive antennas of UEs 610 and 612. Therefore, the second base station 604 can serve each of UEs 610 and 612 with a single data stream. Note that the interference from the second base station 604 also occupies two dimensions of the four dimensional space of UEs 606 and 608. This implies that first base station 602 cannot serve UEs 606 and 608 collectively more than a maximum of M/2 data streams (e.g., M/4 for each) simultaneously without preventing (or reducing the ability of) UE 610 from communicating with second base station 604. Thus, a maximum of M total simultaneous data streams can be supported in example 600, when first base station 602 and second base station 604 have the capability to support up to 2M simultaneous data streams.

Interference alignment is an approach for managing interference by grouping or aligning interfering signals from one or more interferers in a common sub-space of the signaling space (e.g., a single receive antenna, single time, single frequency, etc). By doing so, other sub-spaces of the signaling space can be freed for transmitting or received desired signals. For example, referring to FIG. 6, if the interference from first base station 602 is aligned in a common sub-space at UE 610 (e.g. the interference from base station 602 collapses into one single dimension at UE 610), at least one receive antenna can be freed at UE 610 to receive additional data streams from second base station 604. Alternatively, freeing a receive antenna at UE 610 can enable first base station 602 to serve an additional UE without affecting the current downlink communication from second base station 604 and UE 610. As such, interference alignment can be used to increase the data throughput in a cellular network.

Figure 7:
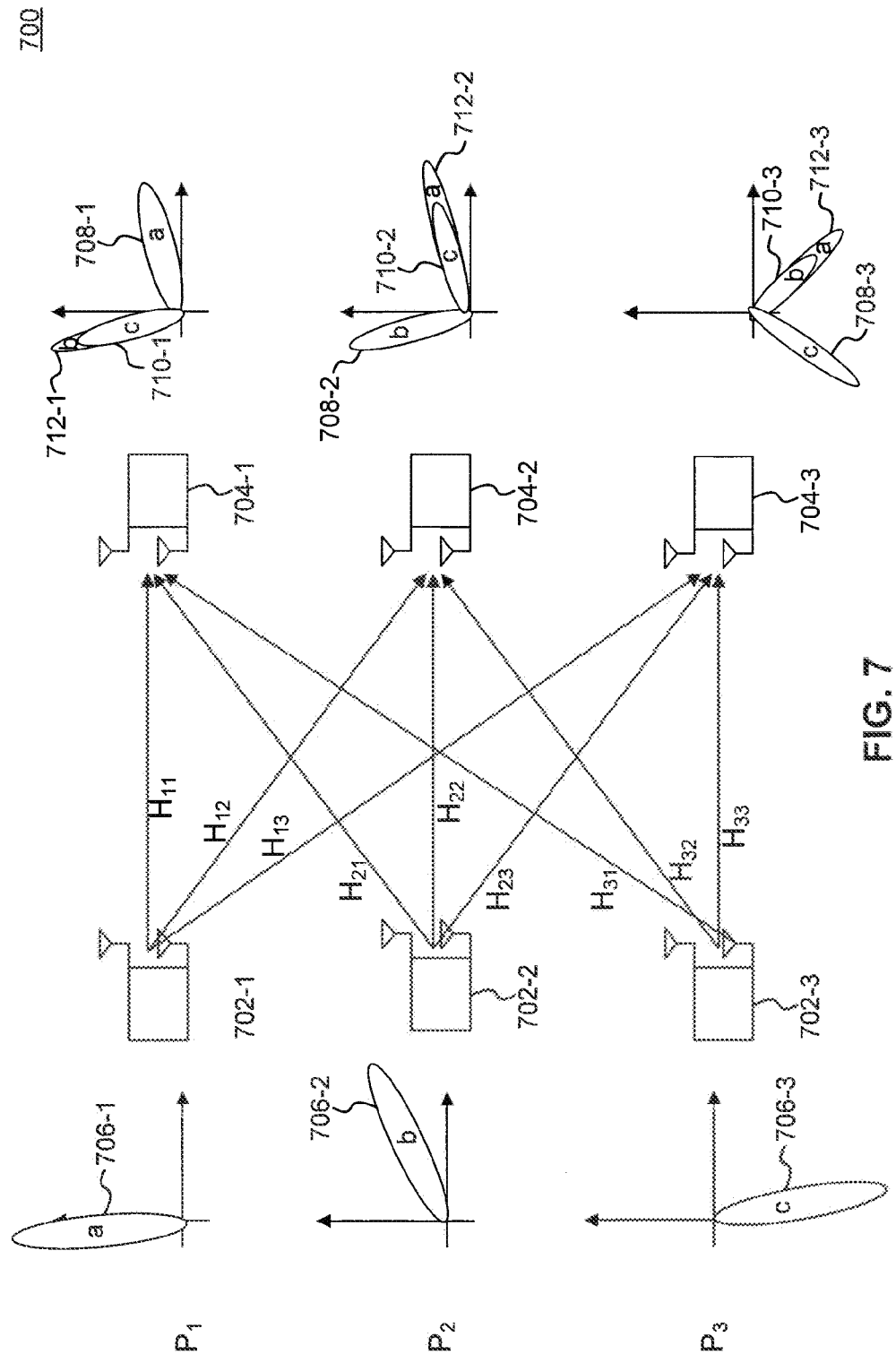
FIG. 7 is an example that illustrates interference alignment using a joint precoder design according to an embodiment.

FIG. 7 is an example 700 that illustrates interference alignment using a joint precoder design according to an embodiment. Example 700 is provided for the purpose of illustration only and is not limiting of embodiments. As shown in FIG. 7, example 700 includes first, second, and third base stations 702-1, 702-2, and 702-3, and first, second, and third UEs 704-1, 704-2, and 704-3. For the purpose of illustration only, it is assumed that UEs 704-1, 704-2, and 704-3 are served respectively by first, second, and third base stations 702-1, 702-2, and 702-3. Also for the purpose of illustration, it is assumed that base stations 702-1, 702-2, and 702-3 and UEs 704-1, 704-2 and 704-3 each includes two antennas.

First, UEs 704-1, 704-2, and 704-3 are in proximity to each other such, that each UE 704 experiences interference from two of first, second, and third base stations 702-1, 702-2, and 702-3 (by experiencing interference, it is meant that the power level of the interfering signal is comparable to that of the desired signal such that the interfering signal cannot be treated as noise).

Without interference management (e.g., interference avoidance, suppression, or alignment), a UE 704 communicates with its serving base station 702 with a degraded performance because the two receive antennas of UE 704 do not provide enough degrees of freedom for UE 704 to decode a desired signal from its serving base station and two interfering signals from the two interfering base stations.

Using interference alignment, as shown in FIG. 7, the two interfering signals from the two interfering base stations can be grouped or aligned in a common sub-space of the signaling space at each UE 704. This frees up another signaling sub-space for receiving the desired signal. In an embodiment, interference alignment is performed by pre-coding the transmitted signal at each of first, second, and third base stations 702-1, 702-2, and 702-3 with a respective precoder vector configured to cause the interference alignment shown. For example, a signal 706-1 at first base station 702-1 is pre-coded (e.g., multiplied) using a first precoder vector P1 such that it results in a desired signal 708-1 at UE 704-1, an interfering signal 712-2 at UE 704-2, and an interfering signal 712-3 at UE 704-3. More significantly, signals 706-2 and 706-3 at second and third base stations 702-2 and 702-3 are pre-coded using second and third precoder vectors P2 and P3 such that they result in aligned interfering signals 712-1 and 710-1 respectively at UE 704-1. As would be understood by a person of skill in the art based on the teachings herein, when a base station 702 serves more than one UE or provides more than one data stream per UE simultaneously, the precoding is done using a precoding matrix.

In an embodiment, for a UE 704 with M antennas, the first, second, and third precoder vectors P1, P2, and P3 for first, second, and third base stations 702-1, 702-2, and 702-3 respectively can be determined mathematically using the following equations:

$$\text{rank}(H_{11}P_1)=M/2 \quad (1)$$

$$\text{span}(H_{21}P_2)=\text{span}(H_{31}P_3) \quad (2)$$

$$\text{rank}(H_{22}P_2)=M/2 \quad (3)$$

$$\text{span}(H_{12}P_1)=\text{span}(H_{32}P_3) \quad (4)$$

$$\text{rank}(H_{33}P_3)=M/2 \quad (5)$$

$$\text{span}(H_{13}P_1)=\text{span}(H_{23}P_2) \quad (6)$$

where $H_{11}$ represents the channel estimate of the communication channel from first base station 702-1 to first UE 704-1, $H_{12}$ represents the channel estimate of the communication channel from first base station 702-1 to second UE 704-2, $H_{13}$ represents the Channel estimate of the communication channel from first base station 702-1 to third UE 704-3, $H_{21}$ represents the channel estimate of the communication channel from second base station 702-2 to first UE 704-1, $H_{22}$ represents the channel estimate of the communication channel from second base station 702-2 to second UE 704-2, $H_{23}$ represents the channel estimate of the communication channel from second base station 702-2 to third UE 704-3, $H_{31}$ represents the channel estimate of the communication channel from third base station 702-3 to first UE 704-1, $H_{32}$ represents the channel estimate of the communication channel from third base station 702-3 to second UE 704-2, and $H_{33}$ represents the channel estimate of the communication channel from third base station 702-3 to third UE 704-3.

The above equations ensure that for each UE 704, M/2 receive antennas are reserved for desired data streams and that interfering streams from the two interfering base stations are aligned, but require complete channel state information (CSI) (e.g., knowledge of all downlink channel estimates between the base stations and the UEs).

In some cases, providing the complete channel state information (CSI) (e.g., knowledge of all downlink channel estimates between the base stations and the UEs) to all base stations and UEs (e.g., in FIG. 7) can be difficult, accordingly in an embodiment, as an alternative only the UEs estimate the serving and interfering channels. The UEs then find the precoders P1, P2, and P3 and may send them by feedback to the base stations. The UEs as further described below can estimate the serving and interfering channels, in an embodiment, by virtue of the alignment of the reference signals by the base stations as described above. However, embodiments are not limited to this manner of estimating the serving and interfering channels and can be extended to other known methods for obtaining CSI by the UEs.

In embodiments described above (e.g., FIGS. 3, 4, and 5), the UE can calculate a serving channel estimate to a serving base station and one or more interfering channel estimates to one or more interfering base stations during a scheduled time/frequency zone, in which the base stations coordinate to align their respective reference signals. As understood by a person of skill in the art based on the teachings herein, embodiments are not limited to use within a scheduled time/frequency zone but can be extended generally to any other time/frequency period. Thus, the above described embodiments can be used in example 700 to enable each of first, second, and third UEs 704-1, 704-2, and 704-3 to calculate a portion of the complete CSI and to determine a set of precoder vectors P1, P2, and P3 that satisfy its calculated portion of the complete CSI. For example, UE 704-1 can determine its serving channel estimate $H_{11}$ and interfering channel estimates $H_{21}$ and $H_{31}$ and determine a set of P1, P2, and P3 that satisfies equations (1) and (2) above. UE 704-1 can then send the determined set of P1, P2, and P3 to its serving base station 702-1.

In an embodiment, base station 702-1 can coordinate with base stations 702-2 and 702-3, and if the set of precoder vectors P1, P2, and P3 reported by UE 704-1 matches with equivalently determined sets of precoder vector P1, P2, and P3 reported by base stations 702-2 and 702-3, base station 702-1 selects UE 704-1 to be served during the scheduled time/frequency zone and base stations 702-1, 702-2, and 702-3 use respectively the precoder vectors P1, P2, and P3. By doing so, the interference from base stations 702-2 and 702-3 will be aligned at UE 704-1 during the scheduled time/frequency zone.

Figure 8:
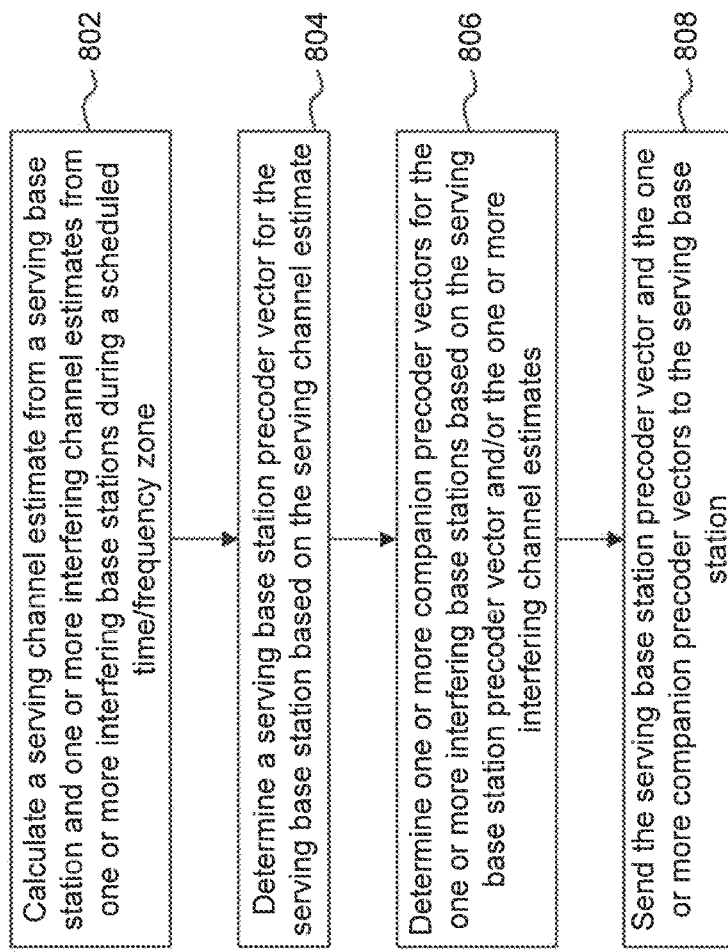
FIG. 8 is an example process for facilitating interference alignment according to an embodiment.

FIG. 8 is an example process 800 for facilitating interference alignment according to an embodiment. Example process 800 is provided for the purpose of illustration only and is not limiting. Example process 800 can be performed by a UE, such as one of UEs 704 in FIG. 7.

As shown in FIG. 8, example process 800 begins in step 802, which includes calculating a serving channel estimate from a serving base station and one or more interfering channel estimates from one or more interfering base stations during a scheduled time/frequency zone. As understood by a person of skill in the art based on the teachings herein, embodiments are not limited to use within a scheduled time/frequency zone but can be extended generally to any other time/frequency period. In an embodiment, step 802 includes performing a step similar to step 504 described with reference to FIG. 5 above, which is enabled by virtue of the base stations aligning their respective non-zero power and zero power reference signals during the scheduled time/frequency zone.

Subsequently, process 800 proceeds to step 804, which includes determining a serving base station precoder vector or possible vectors for the serving base station based on the serving channel estimate. In an embodiment, step 804 further includes calculating the serving base station precoder vector or possible vectors to increase or maximize a data throughput from the serving base station to the UE. In an embodiment, the UE solves for the serving base station precoder vector using the above equations (1)-(6). For example, UE 704-1 can use equation (1). UE 704-2 can use equation (3), and UE 704-3 can use equation (5) to determine its serving base station precoder vector.

Then, in step 806, process 800 includes determining one or more companion precoder vectors for the one or more interfering base stations based on at least one of the serving base station precoder vector and the one or more interfering channel estimates. In an embodiment, step 806 further includes calculating the one or more companion precoder vectors to align or substantially align one or more interfering signals from the one or more interfering base stations in a common sub-space of a signaling space at the UE. In an embodiment, the common subspace occupies a single receive antenna of the UE. In another embodiment, the common sub-space is orthogonal or substantially orthogonal to a sub-space of the signaling space dedicated for receiving a desired signal from the serving base station. In an embodiment, the UE solves for the interfering base station precoder vectors using the above equations (1)-(6). For example, UE 704-1 can use equation (2), UE 704-2 can use equation (4), and UE 704-3 can use equation (6) to determine its interfering base station precoder vectors.

Finally, process 800 terminates in step 808, which includes sending the serving base station precoder vector and the one or more companion precoder vectors to the serving base station.

Another aspect of embodiments is provided in FIGS. 9 and 10 below. In this aspect, base stations coordinate during the scheduling of the time/frequency zone to free a sub-space of the signaling space (which can be the same for every UE) during the time/frequency zone. The freed sub-space provides an additional degree of freedom at the UEs and can be used to serve additional UEs if desired.

Figure 9:
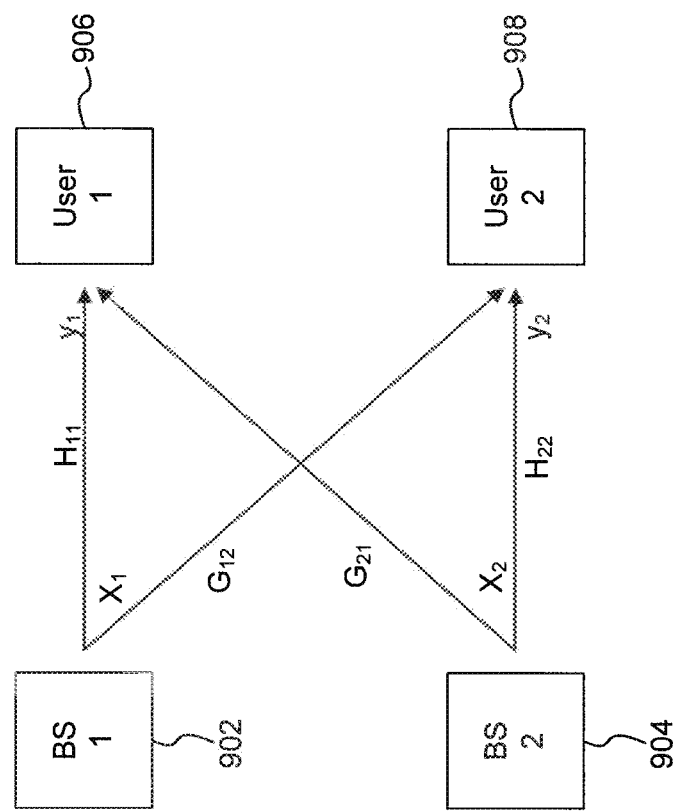
FIG. 9 illustrates an example system model according to an embodiment.

FIG. 9 illustrates an example system model 900 according to an embodiment. Example system model 900 is provided for the purpose of facilitating the presentation of embodiments and is not limiting of embodiments. As shown in FIG. 9, example system model 900 includes a first base station 902, a second base station 904, a first UE 906, and a second UE 908. First base station 902 serves first UE 906 and interferes at second UE 908. The downlink channel from first base station 902 to first 906 is denoted by $H_{11}$ and the downlink channel from first base station 902 to second UE 908 is denoted by $G_{12}$. Second base station 904 serves second UE 908 and interferes at first UE 906. The downlink channel from second base station 904 to first UE 906 is denoted by $G_{21}$ and the downlink channel from second base station 904 to second UE 908 is denoted by $H_{22}$. As would be understood by a person of skill in the art based on the teachings herein, embodiments are not limited to this example system model 900.

In an embodiment, first and second base stations 902 and 904 coordinate during the scheduling of a time/frequency zone to set a reference precoder vector for the time/frequency zone. The reference precoder vector, in an embodiment, is the same for both first and second base stations 902 and 904. Subsequently, first and second base stations 902 and 904 signal the reference precoder vector to their respective UEs 906 and 908. For example, the reference precoder vector is signaled to the UEs along with the signaling of the time/frequency zone. Then, in the time/frequency zone, first and second base stations 902 and 904 transmit in an orthogonal space to the reference precoder vector (in the null space of the reference precoder vector). This causes the interference of first base station 902 (which can be due to the transmission of first base station 902 to TIE 906 as well as to other served UEs) to align in a single sub-space at second UE 908. Similarly, the interference of second base station 904 can be aligned in a single sub-space at first UE 906.

In an embodiment, using example system model 900, the received signal $y_1$ at a given receive antenna of first UE 906 can be written as:

$$y_1 H_{11} x_1 + G_{21} x_2 + n_1 \quad (7)$$

where $x_1$ represents the signal transmitted by first base station 902, $x_2$ represents the signal transmitted by second base station 904, and $n_1$ represents noise.

At first UE 906, the received signal $y_1$ is multiplied with $v_{ref}^H G_{21}^+$, where $v_{ref}^H$ is the Hermetian conjugate of the reference precoder vector $v_{ref}$ and $G_{21}^+$ is the pseudo-inverse of $G_{21}$. This results in:

$$\bar{y}_1 = H_{11}^{eff} x_1 + v_{ref}^H x_2 + \bar{n}_1. \quad (8)$$

With $x_2$ in the null space of $v_{ref}$, the term $v_{ref}^H x_2$ reduces to zero, and equation (8) reduces to:

$$\bar{y}_1 = H_{11}^{eff} x_1 + \bar{n}_1. \quad (9)$$

In an embodiment, the signal $x_2$ is governed by the following equations in order to be in the null space of $v_{ref}$:

$$x_2 = \Sigma_{j=1}^{L} P_{2j} s_{2j} \quad (10)$$

$$P_{2j} = \text{null}(v_{ref}, \{H_{2k}^{eq}\}_{k \neq j}) \quad (11)$$

where $s_{2j}$ represents the data stream from second base station 904 to user j (j from 1 to L in a scenario that base station 904 serves L users).

As such, the only remaining term include the signal $x_1$ transmitted by first base station 902. The signal $x_2$ transmitted by second base station 904 is eliminated by virtue of it being in the null space of the reference precoder vector.

It is noted that UE 906 can measure $H_{11}$ and $G_{21}$ as described above in order to perform the above processing on the signal $y_1$. Specifically, in an embodiment, base stations 902 and 904 perform a similar process as described above in FIGS. 3 and 4 to align their reference signals during the scheduled time/frequency zone in order to enable UE 906 to measure $H_{11}$ and $G_{21}$.

Figure 10:
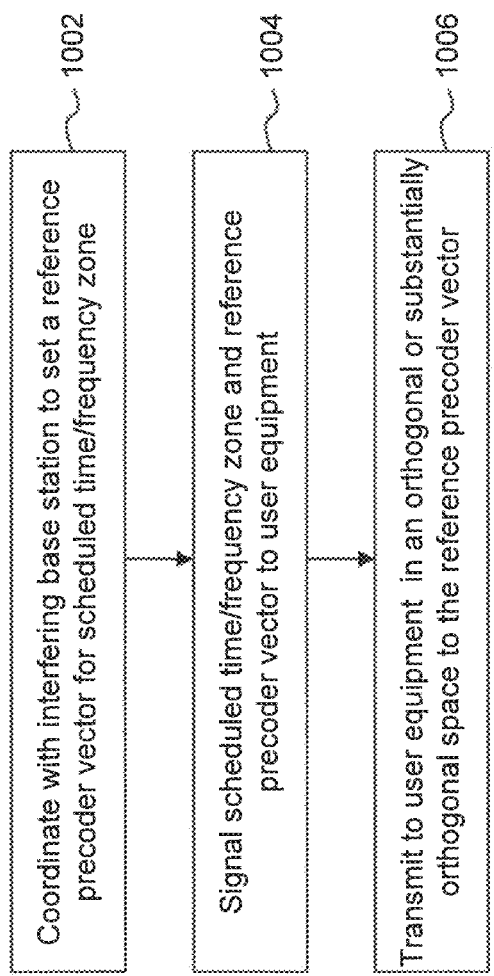
FIG. 10 is an example process for enabling interference alignment at a UE according to an embodiment.

FIG. 10 is an example process 1000 for enabling interference alignment at a UE according to an embodiment. Example process 1000 is provided for the purpose of illustration only and is not limiting of embodiments. Example process 1000 can be performed by a base station, such as base station 902, for example, in order to cause the interference from an interfering base station to align at its served UEs, as well as to cause its own interference to align at any UEs served by the interfering base stations.

As shown in FIG. 10, example process 1000 begins in step 1002, which includes coordinating with an interfering base station to set a reference precoder vector for a scheduled time/frequency zone. In an embodiment, step 1002 includes coordinating during the scheduling of the time/frequency zone to set the reference precoder vector for the time/frequency zone. The reference precoder vector can be the same for both the base station performing example process 1000 and the interfering base station. In an embodiment, process 1000 further includes coordinating with the interfering base station to have the interfering base station transmit in an orthogonal or substantially orthogonal space to the reference precoder vector during the scheduled time/frequency zone. In an embodiment, step 1002 is preceded or followed by the base stations aligning their respective reference signals to allow the UEs to estimate serving and interfering channel estimates.

Subsequently, process 1000 proceeds to step 1004, which includes signaling the scheduled time/frequency zone and the reference precoder vector to the UE. Then, in step 1006, process 1000 includes transmitting a desired signal to the UE in an orthogonal or substantially orthogonal space to the reference precoder vector during the scheduled time/frequency zone. The interfering base station will also transmit in an orthogonal or substantially orthogonal space to the reference precoder vector during the schedule time/frequency zone, resulting in transmissions from the interfering base station being aligned in a common sub-space of a signaling space at the UE.

A further aspect of embodiments is provided in FIGS. 11 and 12 below. In this aspect, base stations coordinate during the scheduling of the time/frequency zone or during UE scheduling for service to free a sub-space of the signaling space for each base station during the time/frequency zone. The freed sub-space can be different from one base station to another and provides an additional degree of freedom at the UEs and can be used to serve additional UEs if desired.

Figure 11:
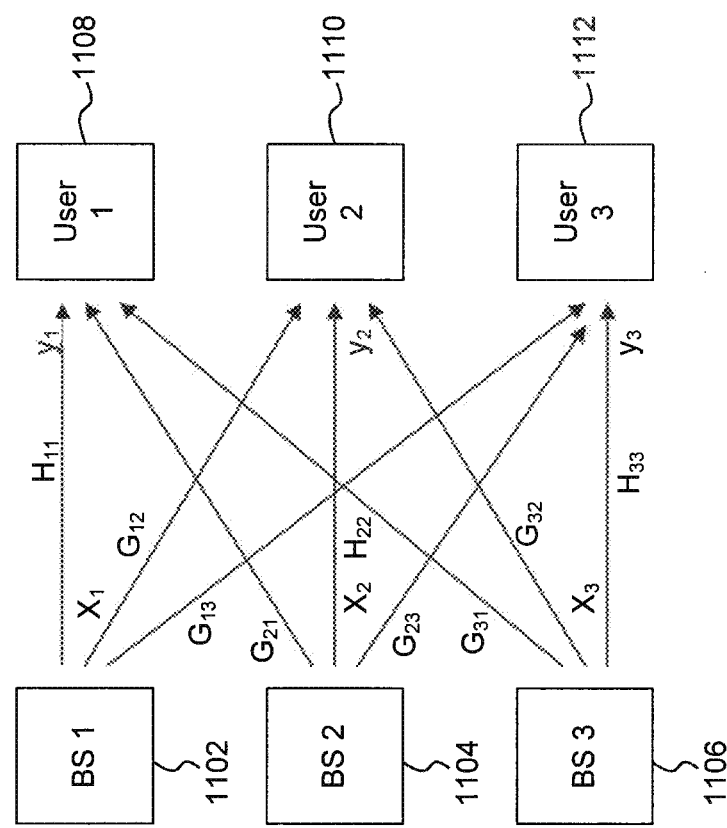
FIG. 11 illustrates another example system model according to an embodiment.

FIG. 11 illustrates another example system model 1100 according to an embodiment. Example system model 1100 is provided for the purpose of facilitating the presentation of embodiments and is not limiting of embodiments. As shown in FIG. 11, example system model 1100 includes a first base station 1102, a second base station 1104, a third base station 1106, a first UE 1108, a second UE 1110, and a third UE 1112. First base station 1102 serves first UE 1108 and interferes at second UE 1110 and third UE 1112. The downlink channel from first base station 1102 to first UE 1108 is denoted by $H_{11}$, to second UE 1110 is denoted by $G_{12}$, and to third UE 1112 is denoted by $G_{13}$. The downlink channel from second base station 1104 to first UE 1108 is denoted by $G_{21}$, to second UE 1110 is denoted by $H_{22}$, and to third UE 1112 is denoted by $G_{23}$. The downlink channel from third base station 1106 to first UE 1108 is denoted by $G_{31}$, to second UE 1110 is denoted by $G_{32}$, and to third UE 1112 is denoted by $H_{33}$.

In an embodiment, first, second, and third base stations 1102, 1104, and 1106 coordinate during the scheduling of the time/frequency zone to set respective reference precoder vectors. The respective reference precoder vectors can be different from one base station to another. First, second, and third UEs 1108, 1110, and 1112 each reports to its serving base station a serving base station precoder vector for its serving base station and one or more companion precoder vectors for its interfering base stations (e.g., by solving the IA equations (1)-(6) above). For example, first UE 1108 reports to first base station 1102 a serving base station precoder vector for first base station 1102 and companion precoder vectors for second and third base stations 1104 and 1106. In an embodiment, UE 1108 selects the serving base station precoder vector to increase or maximize its data throughput from first base station 1102 and selects the companion precoder vectors to align the interference from second and third base stations 1104 and 1106 in a common sub space of the signaling space at UE 1108. In an embodiment, the common-subspace is orthogonal or substantially orthogonal to a sub-space dedicated for receiving desired signals from first base station 1102.

In an embodiment, if first UE 1108 reports companion precoder vectors that are in the null space of its respective reference precoder vector set during scheduling of the time/frequency zone, then UE 1108 can be selected for service during the scheduled time/frequency zone. Otherwise, first UE 1108 is not selected for service during the scheduled time/frequency zone. In an embodiment, UE 1108 is selected for service if additionally the set of precoder vectors (P1, P2, and P3) reported by UE 1108 matches with equivalently determined sets of precoder vectors reported by second and third UEs 1110 and 1112. Base stations serving many users can select those users that satisfy these conditions.

In another embodiment, UE 1108 knows the respective reference precoder vector of first base station 1102 before computing the precoder vectors and therefore attempts to compute/find precoder vectors that, in addition to the above described criteria, include companion precoder vectors that are in the null space of the reference precoder vector of first base station 1102. In an embodiment, UE 1108 may or may not be successful in computing such precoder vectors, and accordingly UE 1108 further reports to first base station 1102 whether or not it was able to successfully compute the precoder vectors according to the set criteria.

In another embodiment, first, second, and third UEs 1108, 1110, and 1112 each reports to its serving base station a serving base station precoder vector for its serving base station and one or more companion precoder vectors for its interfering base stations. In an embodiment, the precoder vectors are computed to satisfy the criteria described above (the serving base station precoder vector is selected to increase of maximize data throughput from the serving base station, and the companion precoder vectors are selected to align the interference). In light of the reported precoder vectors from all user equipments (including first, second, and third UEs 1108, 1110, and 1112), first, second, and third base stations 1102, 1104, and 1106 coordinate to set their respective reference precoder vectors for the scheduled time/frequency zone, and select a set of user equipments to serve during the scheduled time/frequency zone that, in addition to reporting matching sets of precoder vectors, each also reports companion precoder vectors that are in the null space of the reference precoder vector of its serving base station.

In another embodiment, first, second, and third UEs 1108, 1110, and 1112 each additionally reports to its serving base station a reference precoder vector for its serving base station. The reference precoder vector is selected such that the companion precoder vectors are in the null space of the reference precoder vector. First, second, and third base stations 1102, 1104, and 1106 then coordinate to select a set of user equipments that reported matching sets of precoder vectors to serve during the scheduled time/frequency zone. First, second, and third base stations 1102, 1104, and 1106 adopt the respective reference precoder vectors reported by the selected set of user equipments for the scheduled time/frequency zone.

In an embodiment, using example system model 1100, the received signal $y_1$ at a given receive antenna of first UE 1108 can be written as:

$$y_1 = H_{11}P_1x_1 + G_{21}P_2x_2 + G_{31}P_3x_3 + n_1 \quad (11)$$

where $x_1$, $x_2$, and $x_3$ represent the signals transmitted by first, second, and third base stations 1102, 1104, and 1106, respectively; and $P_1$, $P_2$, and $P_3$ represent the precoder vectors used at first, second, and third base stations 1102, 1104, and 1106, respectively, in the transmission of $x_1$, $x_2$, and $x_3$.

In an embodiment, first UE 1108 computes a serving base station precoder vector P1 to increase or maximize its data throughput from first base station 1102. In addition, UE 1108 solves the following equation to find the companion precoder vectors P2 and P3 for interfering second and third base stations 1104 and 1106 (in other embodiments, UE 1108 can determine more than one pair of precoder vectors):

$$\text{span}(G_{21}P_2) = \text{span}(G_{31}P_3) \quad (12)$$

It is noted that equation (12) is an application of the more general equation:

$$\text{span}(G_{ji}P_j) = \text{span}(G_{ki}P_k), j, k \neq i \quad (13)$$

which UE 1108 can use for any number of interfering base stations, to find the companion precoder vectors that ensure that the interference of any two interfering base stations is aligned. In another embodiment, the companion precoder vectors can be found using the following equation, if Pj and Pk are rank one precoders:

$$G_{ji}P_j = \alpha G_{ki}P_k, j, k \neq i. \quad (14)$$

In another embodiment, if codebook based precoding is used, UE 1108 can use the following equation to find the companion precoder vectors:

$$\min \|G_{ji}P_j - \alpha G_{ki}P_k\|^2, j, k \neq i. \quad (15)$$

First UE 1108 then reports the computed precoder vectors P1, P2, and P3 to first base station 1102. If UE 1108 is selected by first base station 1102 to serve during the scheduled time/frequency, then the received signal $y_1$ can be described mathematically as:

$$y_1 = H_{11}P_1x_1 + G_{21}P_2x_2 + G_{31}P_3x_3 + n_1 \quad (16)$$

In an embodiment, UE 1108 multiplies the received signal $y_1$ with $v_{ref,1}{}^H G_{21}{}^+$, where $v_{ref,1}{}^H$ is the reference precoder vector of first base station 1102 and $G_{21}{}^+$ is the pseudo-inverse of $G_{21}$, resulting in:

$$\bar{y}_1 = v_{ref,1}{}^H G_{21}{}^+ H_{11}P_1x_1 + v_{ref,1}{}^H P_2x_2 + v_{ref,1}{}^H G_{21}{}^+ G_{31}P_3x_3 + \bar{n}_1 \quad (17)$$

From equation (14), we have:

$$P_2 = G_{21}{}^+ G_{31}P_3 \quad (18)$$

and substituting equation (18) into equation (17), results in:

$$\bar{y}_1 = v_{ref,1}{}^H G_{21}{}^+ H_{11}P_1x_1 + v_{ref,1}{}^H P_2x_2 + v_{ref,1}{}^H P_2x_3 + \bar{n}_1. \quad (19)$$

In an embodiment, with $P_2$ selected by UE 1108 to be in the null space of the reference precoder vector of first base station 1102 $v_{ref,1}{}^H$, equation (19) reduces to:

$$\bar{y}_1 = v_{ref,1}{}^H G_{21}{}^+ H_{11}P_1x_1 + \bar{n}_1. \quad (20)$$

This means that with $P_2$ in the null space of $v_{ref,1}{}^H$ and $P_2$ and $P_3$ related by the interference alignment equations (12), (13), (14), or (15) above, the interference can be eliminated from the received signal $y_1$ in at least one sub-space of the signaling space at first UE 1108.

As described above in FIGS. 3, 4, and 5, UE 1108 can determine $G_{21}$ and $H_{11}$ from the base stations aligning their respective reference signals during the time/frequency zone, and can learn $v_{ref,1}{}^H$ from first base station 1102 to solve equation (20) for $x_1$.

Figure 12:
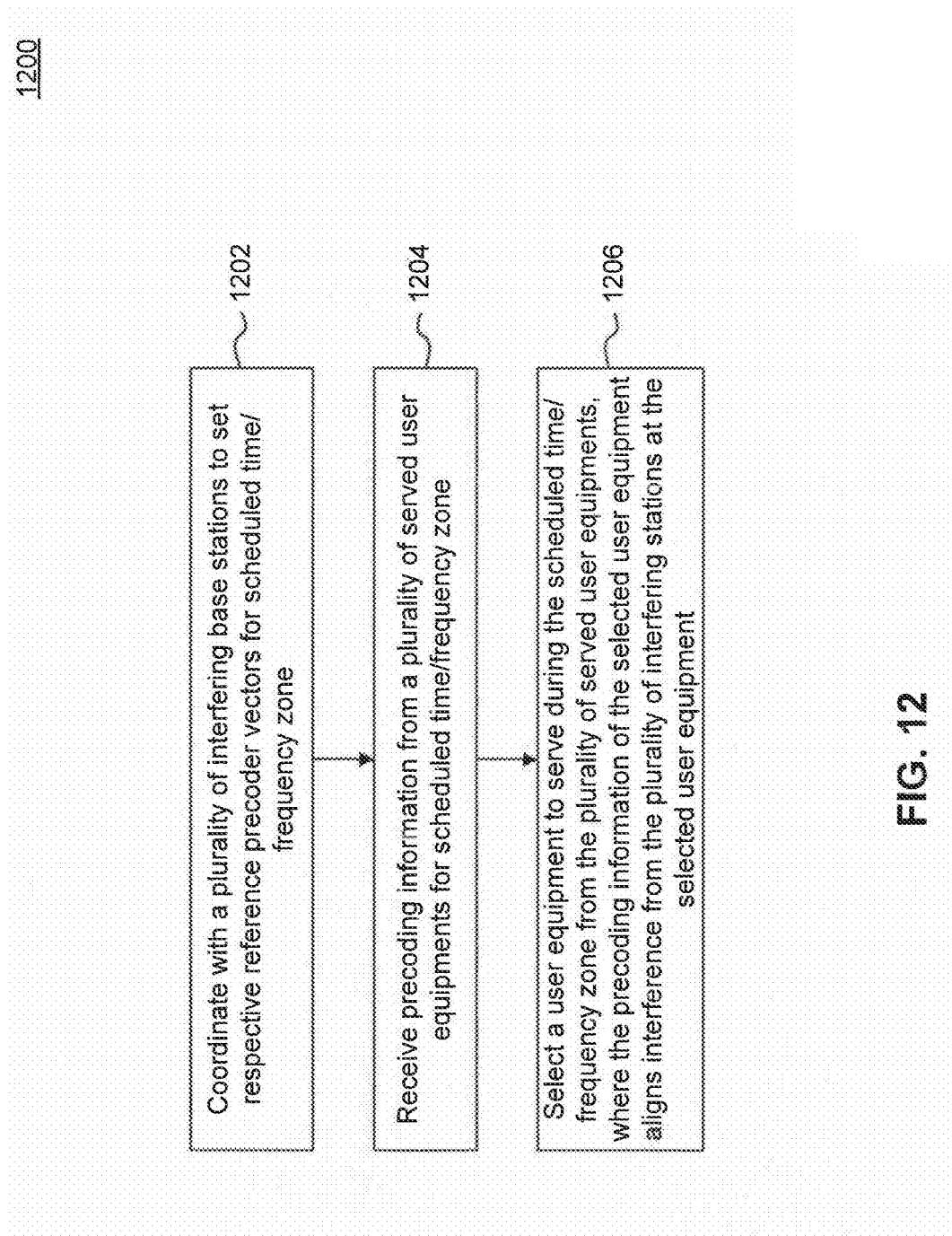
FIG. 12 is an example process for enabling interference alignment at a UE according to an embodiment.

FIG. 12 is an example process 1200 for enabling interference alignment at a UE according to an embodiment. Example process 1200 is provided for the purpose of illustration only and is not limiting of embodiments. Example process 1200 can be performed by a base station, such as base station 1102, for example, in order to cause the interference from interfering base stations (e.g., 1104 and 1106) to align at its served UEs (e.g., first UE 1108), as well as to cause its own interference to align at any UEs served by the interfering base stations.

As shown in FIG. 12, process 1200 begins in step 1202, which includes coordinating with a plurality of interfering base stations to set respective reference precoder vectors for a scheduled time/frequency zone. In an embodiment, the respective reference precoder vectors include a reference precoder vector for each of the base station performing process 1200 and the plurality of interfering base stations. In an embodiment, step 1202 is preceded or followed by the base stations aligning their respective reference signals to allow the UEs to estimate serving and interfering channel estimates.

Subsequently, process 1200 proceeds to step 1204, which includes receiving precoding information from a plurality of served UEs for the scheduled time/frequency zone. For example, referring to FIG. 11, first base station 1102 can receive precoding information from first UE 1108 and any other served UEs (not shown in FIG. 11). In an embodiment, the precoding information from each of the plurality of served UEs includes a precoding matrix index (PMI) for the base station performing process 1200 and a plurality of companion PMIs for the plurality of interfering base stations.

Finally, process 1200 terminates in step 1206, which includes selecting a UE to serve during the scheduled time/frequency zone from the plurality of served UEs, where the received precoding information of the selected UE aligns or substantially aligns interference from the plurality of interfering stations at the selected UE. In an embodiment, the precoding information of the selected UE includes a first companion PMI (of the plurality of companion PMIs) for a first interfering base station of the plurality of interfering base stations that is orthogonal or substantially orthogonal to the reference precoder vector of the base station performing process 1200. In another embodiment, the precoding information of the selected UE includes at least a second companion PMI (of the plurality of companion PMIs) for a second interfering base station of the plurality of base stations that is related to the first companion PMI in order to align transmissions from the first and the second interfering base stations in a common sub-space of a signaling space at the selected UE.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for facilitating interference alignment at a user equipment, comprising:
   calculating a serving channel estimate from a serving base station, using a non-zero power reference signal of the serving base station that overlaps in time and frequency with a zero power reference signal of an interfering base station, and one or more interfering channel estimates from one or more interfering base stations during a scheduled time and frequency (time/frequency) zone;
   determining a serving base station precoder vector for the serving base station based on the serving channel estimate;
   determining one or more companion precoder vectors for the one or more interfering base stations based on at least one of the serving base station precoder vector and the one or more interfering channel estimates; and
   sending the serving base station precoder vector and the one or more companion precoder vectors to the serving base station for comparison with precoder vectors reported by the one or more interfering base stations.

2. The method of claim 1, wherein said calculating comprises calculating the serving channel estimate and the one or more interfering channel estimates from time and frequency aligned respective reference signals of the serving base station and the one or more interfering base stations during the scheduled time/frequency zone.

3. The method of claim 1, wherein the respective reference signals include at least the non-zero power reference signal of the serving base station and zero power reference signals of the one or more interfering base stations.

4. The method of claim 1, wherein determining the serving base station precoder vector comprises calculating the serving base station precoder vector to increase or maximize a data throughput from the serving base station to the user equipment.

5. The method of claim 1, wherein determining the one or more companion precoder vectors comprises calculating the one or more companion precoder vectors to align or substantially align one or more interfering signals from the one or more interfering base stations in a common sub-space of a signaling space at the user equipment.

6. The method of claim 5, wherein the common sub-space occupies a single receive antenna of the user equipment.

7. The method of claim 5, wherein the common sub-space is orthogonal or substantially orthogonal to a sub-space of the signaling space dedicated for receiving a desired signal from the serving base station.

8. A method for facilitating interference alignment at a user equipment, comprising:
   calculating a serving channel estimate from a serving base station using a non-zero power reference signal of the serving base station that overlaps in time and frequency with a zero power reference signal of an interfering base station;
   calculating an interfering channel estimate from an interfering base station using a non-zero power reference signal of the interfering base station that overlaps in time and frequency with a zero power reference signal of the serving base station;
   determining a serving base station precoder vector for the serving base station based on the serving channel estimate;

determining a companion precoder vector for the interfering base station based on the serving base station precoder vector and the interfering channel estimate; and sending the serving base station precoder vector and the companion precoder vector to the serving base station for comparison with precoder vectors reported by the one or more interfering base stations.

9. The method of claim 8, wherein the non-zero power reference signal of the serving base station overlaps in time and frequency with the zero power reference signal of the interfering base station during a scheduled time and frequency (time/frequency) zone.

10. The method of claim 9, wherein the scheduled time/frequency zone is signaled to the user equipment using an Almost Blank Subframe defined by a Long-Term Evolution standard.

11. The method of claim 8, wherein determining the serving base station precoder vector comprises calculating the serving base station precoder vector to increase or maximize a data throughput from the serving base station to the user equipment.

12. The method of claim 8, wherein determining the companion precoder vector comprises calculating the companion precoder vector to align or substantially align an interfering signal from the interfering base station and one or more other interfering signals in a common sub-space of a signaling space at the user equipment.

13. The method of claim 12, wherein the common sub-space occupies a single receive antenna of the user equipment.

14. The method of claim 12, wherein the common sub-space is orthogonal or substantially orthogonal to a sub-space of the signaling space dedicated for receiving a desired signal from the serving base station.

15. A method for facilitating interference alignment at a user equipment, comprising:

receiving an Almost Blank Subframe that signals a scheduled time and frequency (time/frequency) zone;

calculating a serving channel estimate from a serving base station and one or more interfering channel estimates from one or more interfering base stations based on time and frequency aligned respective reference signals of the serving base station and the one or more interfering base stations received during the time/frequency zone, wherein the respective reference signals include at least a non-zero power reference signal of the serving base station and zero power reference signals of the one or more interfering base stations;

determining a serving base station precoder vector for the serving base station based on the serving channel estimate;

determining one or more companion precoder vectors for the one or more interfering base stations based on at least one of the serving base station precoder vector and the one or more interfering channel estimates;

sending the serving base station precoder vector and the one or more companion precoder vectors to the serving base station; and comparing the serving base station precoder vector and the one or more companion precoder vectors with precoder vectors reported by the one or more interfering base stations.

16. The method of claim 15, wherein determining the serving base station precoder vector comprises calculating the serving base station precoder vector to increase or maximize a data throughput from the serving base station to the user equipment.

17. The method of claim 15, wherein determining the one or more companion precoder vectors comprises calculating the one or more companion precoder vectors to align or substantially align one or more interfering signals from the one or more interfering base stations in a common sub-space of a signaling space at the user equipment.

18. The method of claim 17, wherein the common sub-space occupies a single receive antenna of the user equipment.

19. The method of claim 17, wherein the common sub-space is, orthogonal or substantially orthogonal to a sub-space of the signaling space dedicated for receiving a desired signal from the serving base station.

20. The method of claim 1, wherein determining the one or more companion precoder vectors comprises calculating the one or more companion precoder vectors to align one or more interfering signals from the one or more interfering base stations in a common sub-space of a signaling space at the user equipment.

* * * * *